United States Patent [19]
Calhoun et al.

[11] 3,737,982
[45] June 12, 1973

[54] METHOD OF AND APPARATUS FOR MEASURING THE TEMPERATURE OF A MOVABLE ELONGATED CONDUCTOR

[75] Inventors: John Charles Calhoun, Atlanta, Ga.; William Malcolm Flegal, Charleston, S.C.

[73] Assignee: Western Electric Company, Incorporated, New York, N.Y.

[22] Filed: Nov. 15, 1971

[21] Appl. No.: 198,514

[52] U.S. Cl. .................. 29/573, 29/574, 29/593, 73/359, 136/211, 136/221, 136/232, 264/40
[51] Int. Cl.. B28b 19/00, G01k 7/08, G01k 13/06, H01v 1/04
[58] Field of Search .................. 29/573, 574, 593; 73/359; 264/40; 136/211, 221, 232

[56] References Cited
UNITED STATES PATENTS

| | | | |
|---|---|---|---|
| 3,221,554 | 12/1965 | Kuether | 73/359 |
| 3,534,610 | 10/1970 | Pruden | 73/359 |
| 3,544,665 | 12/1970 | Bowers | 264/40 |

FOREIGN PATENTS OR APPLICATIONS

| | | | |
|---|---|---|---|
| 1,088,007 | 9/1960 | Germany | 73/359 |
| 928,960 | 6/1963 | Great Britain | 73/359 |

Primary Examiner—Louis R. Prince
Assistant Examiner—Frederick Shoon
Attorney—W. M. Kain, J. B. Hoofnagle and A. C. Schwarz, Jr.

[57] ABSTRACT

The temperature variation of a movable elongated conductor, for example, a copper wire, may be determined by butt-joining a length of dissimilar conductor, for example, a length of constantan wire, to the wire to form a thermocouple junction between the wires and connecting a potentiometric recording device across a series connection of the formed junction and a reference junction at a known temperature. Several junctions may be incorporated in a wire at spaced predetermined intervals such that one junction at a time may be passed through a process which involves the transfer of thermal energy between the wire and a processing facility, for example, an extruder head in an insulating line wherein a sheath of plastic insulation is applied to the conductor. As long as the temperatures of the remaining junctions are known, they may be utilized collectively as a reference junction to obtain the time variation in the thermoelectrically generated voltages which are directly proportional to the temperature of the junction passing through the process.

25 Claims, 6 Drawing Figures

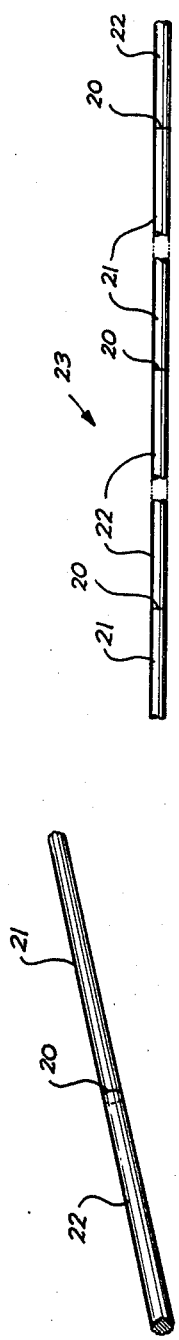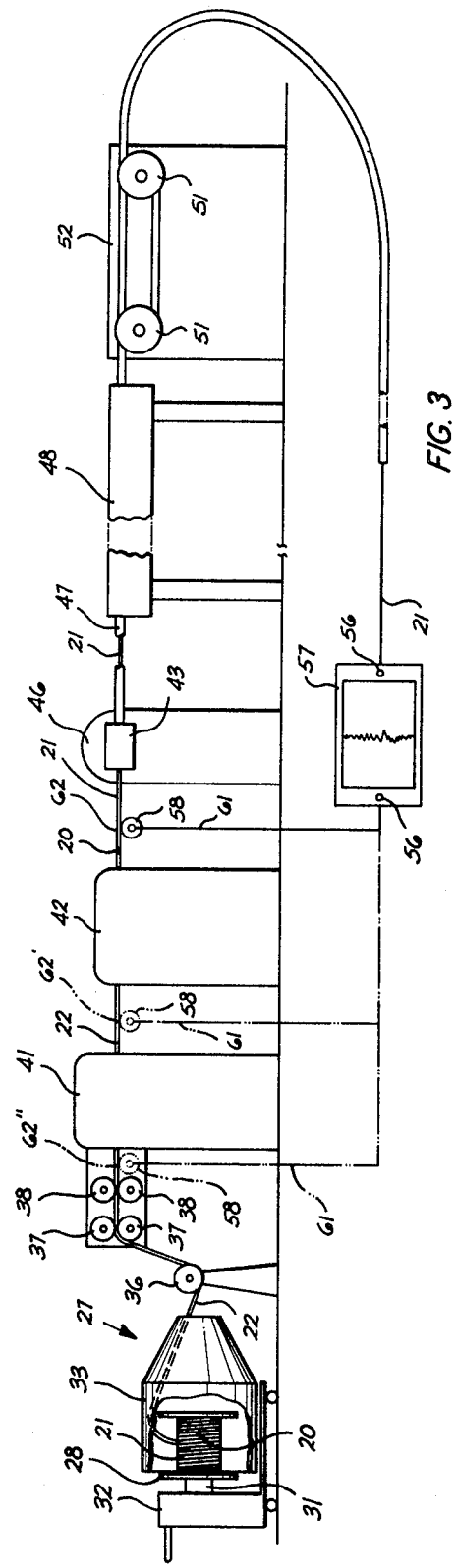

METHOD OF AND APPARATUS FOR MEASURING THE TEMPERATURE OF A MOVABLE ELONGATED CONDUCTOR

BACKGROUND OF THE INVENTION

1. Field of the Invention

The present invention relates to methods of and apparatus for measuring the temperature of a movable elongated conductor, and more particularly to methods of and apparatus for measuring the temperature of a moving wire undergoing a process.

2. Technical Considerations and Prior Art

In the manufacture of wire and cable, a movable elongated conductor, for example, a copper wire or the like, is passed longitudinally through several processes involving the transfer of thermal energy between the conductor and the processing facility. For example, in extruding a plastic insulating sheath on a wire, it is necessary to pass the wire through a preheater prior to applying the insulation thereto in order to insure a uniformly sheathed product having a proper bond between the plastic and the wire. It is also necessary to cool the wire subsequent to insulating it to solidify the molten plastic and to facilitate further handling of the wire. Additionally, the wire may be annealed prior to preheating to increase its ductility.

In the foregoing exemplary types of processes, the temperature of the conductor at certain locations in the process is of considerable interest, particularly in determining the speed with which the wire may be passed through the process and in obtaining the optimum design of the processing equipment. In the past, the temperature of a movable elongated conductor undergoing a manufacturing process involving the heating or cooling of the conductor has been determined utilizing various methods wherein a temperature measuring device, such as a thermocouple, was positioned at selected points along the path of the conductor through the process in rolling contact with or proximate to the conductor. The employment of these prior art methods precluded the measurement of the temperature of the conductor in places difficult of access by the thermocouple, for example, in an extruder head or in an annealer or preheater in a plastic insulating line. Furthermore, no methods were available for measuring the temperature of a moving conductor both during and after insulation was applied thereto. It has heretofore been possible merely to measure the temperature of the insulation only and the temperature of the conductor had to be approximated utilizing empirically determined thermal characteristics of the conductor and the insulation.

In order to utilize a thermocouple to measure the temperature of a conductor after it has been insulated requires that a method be devised which holds the thermocouple junction in thermal communication with the interior of the insulated conductor. It can be seen that if the thermocouple junction can be made part of the conductor itself, the temperature of the junction will be identically the temperature of the conductor without any corrections being required and the response of the junction to temperature changes will be instantaneous. Additionally, a thermocouple which is a part of the conductor could move through the process with the conductor and could be utilized to give the temperature history of the conductor as it is processed.

SUMMARY OF THE INVENTION

An object of the present invention is to provide a new and improved method of and apparatus for measuring the temperature of a movable elongated conductor.

A further object of the present invention is to provide a new and improved method of and apparatus for determining the temperature variation of a moving conductor as it undergoes a process involving the transfer of thermal energy between the wire and the process facility.

A further object of the present invention is to provide a new and improved method of and apparatus for accurately predicting heating and cooling rates in conductor wire when it is subjected to any of various manufacturing processes and particularly to a plastic insulating process.

With these and other objects in view, a method of measuring the temperature of a movable elongated conductor, embodying certain principles of the present invention, may include the steps of joining the end of a length of dissimilar conductor to the end of the elongated conductor to form a thermocouple junction between the joined conductors, connecting the formed junction serially in a circuit to a second thermocouple junction at a known temperature to generate a potential across the junctions which is directly related to the temperature difference therebetween, moving the joined conductors longitudinally to move the formed junction along the longitudinal path of the conductors, and measuring the generated potential while the junction is moving to obtain the temperature of the elongated conductor at the formed junction.

An apparatus for measuring the temperature of a movable elongated conductor, embodying certain principles of the present invention, may include a thermocouple junction formed in the conductor by joining the end of a length of dissimilar conductor to an end of the conductor, a second thermocouple junction at a known temperature, means for serially connecting the formed junction to the reference junction in a series circuit to generate a potential across the junctions which is directly related to the temperature difference therebetween, means for moving the joined conductors longitudinally to move the formed junction along the longitudinal path of the conductors and means for measuring the generated potential while the junction is moving to obtain the temperature of the elongated conductor at the formed junction.

BRIEF DESCRIPTION OF THE DRAWINGS

The objects and various features of the invention will be more readily understood from the following detailed description of a specific embodiment thereof, when read in conjunction with the accompanying drawings, wherein:

FIG. 1 shows a thermocouple junction formed in an elongated conductor by joining together two lengths of dissimilar conductors;

FIG. 2 shows a plurality of thermocouple junctions identical to the junction of FIG. 1, formed in a conductor wire by alternately joining together lengths of two dissimilar conductors;

FIG. 3 shows an arrangement for monitoring the emf produced by individual ones of a plurality of thermocouple junctions formed serially in a conductor wire as each is passed through an insulation process wherein a plastic sheath is applied to the wires by an extruder;

DETAILED DESCRIPTION

Figure 4:
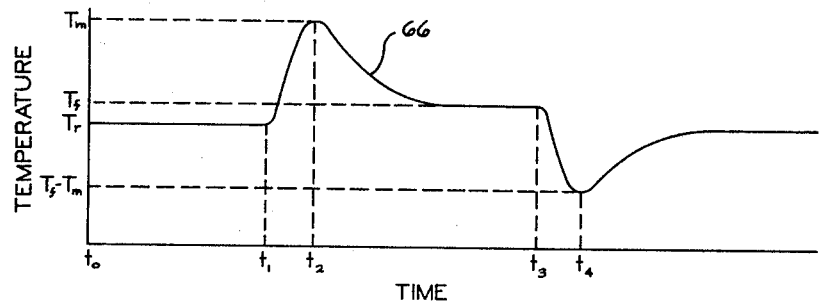
FIG. 4 is a curve representing the time variation of the temperature of a conductor wire passing through an insulating process as indicated by the emf generated by two thermocouple junctions formed in the conductor wire wherein each thermocouple junction is first passed individually through an extruder for extruding plastic insulation thereon and a cooling trough for solidifying the molten plastic.

Referring to FIG. 1, there is shown a thermocouple junction 20 formed by joining together axially the ends of a pair of dissimilar wires 21 and 22, which may be, for example, copper and constantan, respectively. The junction 20 is preferably formed by butt-joining the ends of the wires 21 and 22 to obtain a sharply defined boundary therebetween.

If the junction 20 is connected in a series circuit with another junction composed of the same two dissimilar metals and at a different temperature, a potential appears across the junctions. This potential or thermal emf, which may be in the order of several millivolts, is directly related to the temperature difference between the junctions and, if the temperature of one junction is known, the temperature of the other junction may be calculated. Thus the junction 20 may be utilized as one junction of a thermocouple thermometer to indicate the temperature of both wires 21 and 22 at the junction 20.

It can be seen that if it is desired to determine the temperature of a conductor wire while the wire is moving longitudinally through a manufacturing process involving the transfer of thermal energy between the wire and the processing facility, a thermocouple junction 20 may be formed in the wire and utilized to generate thermoelectric voltages from which the temperature of the jucntion 20, which is exactly equal to the temperature of the end of the length of wire at which is formed, may be determined to give an accurate and instantaneous indication of the time variation of the temperature of the wire as it is processed. This provides a valuable research tool in the manufacture of wire and cable.

The time-temperature information may be verified regarding its repeatability by constructing a conductor wire containing several thermocouple junctions spaced a sufficient distance apart to permit only one junction at a time to move through the particular process under study. As shown in FIG. 2, a plurality of thermocouple junctions 20—20 may be formed in a patchwork-type wire 23 by butt-joining together alternating lengths 21 and 22 made of copper and constantan, respectively.

Until now, no method was available to measure the temperature of the wire itself rather than the temperature of a device in thermal communication with the wire such as a stationary thermocouple which renders less sensitive and less accurate temperature information due to the loss of thermal energy on transfer thereof from the wire to the measuring device. Furthermore, utilizing the instant method, it matters little whether or not the conductor, the temperature of which it is desired to measure, is insulated or not since the conductor itself is part of a monitorable thermocouple junction.

A specific embodiment of an apparatus for accurately determining the temperature variation of a conductor wire being processed through an insulating line is shown in FIG. 3. Referring to FIG. 3, an insulating line, generally indicated at 26, includes a wire supply 27 wherein a reel 28 containing a supply of copper wire 21 having at least one length of constantan wire 22 butt-joined thereto to form a thermocouple junction 20. For the purpose of the present discussion it will be assumed that two junctions 20-20 are formed in the wire 21 by butt-joining both ends of a suitable length of constantan wire 22 to the wire 21. The constantan wire 22 is of sufficient length to allow only one junction at a time to pass through the line 26. The reel 28 may be supported on a spindle 31 mounted on a truck 32 positioned at the supply end of the line 26.

The wire 21 is passed from the reel 28 through a hood 33 around a guide sheave 36, through two sets of wire straightening rollers 37—37 and 38—38 through an annealer 41, a preheater 42 and a head 43 on an extruder 46.

The annealer 41 serves to increase the ductility of the copper wire 21 by heating it to a high temperature, for example, 800°F or 900°F for copper, and then rapidly quenching it in a water bath contained within the annealer 41.

The preheater 42 heats the annealed wire to a predetermined temperature, typically 250°F or 300°F, to insure proper adhesion of the insulating sheath to the wire.

The wire 21 is insulated in the extruder head 43 with a sheath 47 of plastic material, for example, low or high density polyethylene, polypropylene, polyvinyl chloride, nylon, or the like.

The insulated wire 21 is passed through a water cooling trough 48 where it is cooled down, solidifying the molten plastic thereon, emerging from the trough 48 at a lower temperature than that at which it passed out of the extruder head 43 and is passed around a pair of rotating sheaves 51—51 on a capstan 52 which advances the wire 21 through the line 26. The cooled insulated wire 21 exiting the capstan 52 may be accumulated in a container (not shown) or taken up on a reel (not shown).

The leading end of the insulated wire 21 may be electrically connected to one of a pair of input terminals 56—56 on a potentiometric recording device 57, such as a strip chart recorder or the like. The other terminal 56 may be connected to a suitable bare wire connecting device such as a copper slip ring 58, positioned between the preheater 42 and the extruder 46 through a copper lead wire 61. The device 57 responds to a thermally generated emf but may be scaled to indicate and record temperature directly.

If the annealer 41 and the preheater 42 are turned off and the wire 21 is advanced through the line 26 with the extruder 46 operating, one junction 20 will pass through the line 26 while the other junction 20 is temporarily stored on the reel 28. Plastic insulation 47 will be applied to the wires 21 and 22, including the junction 20, in the extruder head 43. As the first junction 20 enters the extruder head 43, a reference junction will occur at a point of contact 62 between the constantan wire 22 and the copper slip ring 58. Since the annealer 41 and the preheater 42 are assumed not to be operating, the junction 62 will be at the room or ambient temperature, making the junction 62 a convenient reference junction such that the potential difference across the junction 62 and the first junction 20 will be recorded on the recording device 57 as soon as the junction 20 passes the point 62.

The temperature variation of the junction 20 as it passes through the extruder head 43 typically appears as the curve 66 of FIG. 4. As previously pointed out, the recorder 57 may be scaled directly in degrees Fahrenheit such that the curve 66 represents the temperature-time characteristic of the junction 20, and therefore of the copper wire 21 as it is insulated in the extruder head 43.

The portion of curve 66 from $t_o$ t0 $t_1$ represents the temperature of the first junction 20, which is the trailing end of the first length of copper wire 21 butt-joined to the leading end of the length of constantan wire 22, from the time it passes the slip ring 58 ($t_o$) until it reaches the extruder head 43 ($t_1$). This is the ambient or reference temperature $T_r$ of both the first junction 20 and the junction 62 from which all the values on curve 66 may be calculated, and further represents the zero or null reading of the recorder 57.

As the first junction 20 enters the extruder head 43 its temperature begins to rise sharply as the plastic insulation is applied thereto. As the insulated first junction 20 exits the extruder head 43 and enters the cooling trough 48, its temperature continues to rise until it reaches some maximum temperature $T_m$ at a time $t_2$ and then declines to some final temperature $T_f$, which is higher than the ambient temperature $T_r$, while passing around the capstan 52.

As the capstan 52 continues to advance wire 21 from the reel 28 through the line 26, the second junction 20, representing the trailing end of the length of constantan wire 22 butt-joined to the leading end of a second length of copper wire 21, passes from the reel 28 through the insulating line 26. When the second junction 20 passes the contact point 62 at the copper slip ring 58, the point 62 becomes a contact point between two similar metals, i.e., copper and copper, and is no longer a reference junction. However, the temperature of the first junction 20, which has already passed through the line 26, is known at this time from the curve 66 and may be utilized as a reference junction of the thermocouple thermometer.

As can be seen from FIG. 4, the second junction 20 is passed through the extruder head 43 at a time $t_3$ when the temperature again changes sharply, but in the opposite direction on the curve 66, from the final temperature $T_f$ until it reaches the maximum temperature of the conductor $T_f$-$T_m$ at a time $t_4$. The temperature rise in the reverse direction is due to the reversal of polarity of the thermal emf generated across the junctions 20—20 since the relative positions of the copper and constantan wires 21 and 22 are reversed at the second junction 20.

Thus, using the above-described method, the temperature variation of a conductor wire as it is insulated and cooled may be recorded and the record may be utilized to predict the temperature variation of a conductor of the same material and size as it undergoes an insulating process. This record is a valuable tool, particularly in the optimum design of the cooling means for the insulated wire. This eliminates prior art trial-and-error approaches by having a record readily available which may be utilized to predict accurately the cooling rate in a plastic insulated wire.

The above method further may be utilized to predict the temperature variation of a conductor which is preheated before insulation or which is annealed befoe insulation or which is both annealed and preheated before insulation.

Figure 5:
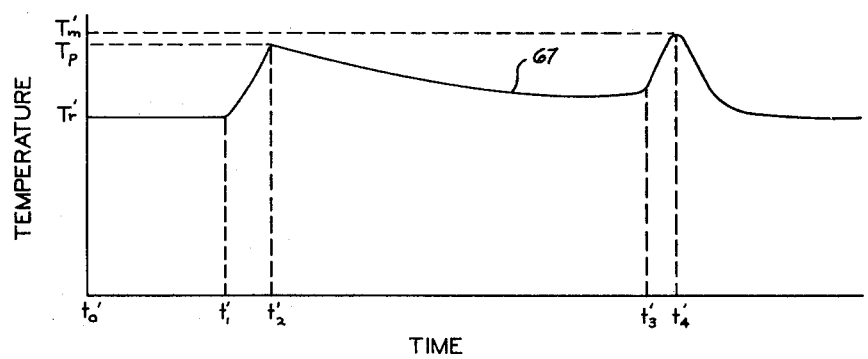
FIG. 5 is a curve similar to the curve of FIG. 4, representing the time variation of the temperature of a conductor wire which is caused to undergo a preheating step before insulation and cooling.

If the preheater 42 in FIG. 3, which may be of the induction heating type, is turned on, with the copper slip ring 58 positioned to contact the wire 21 at a point 62' along the path of the wire 21 between the annealer 41 and the preheater 42, the temperature response of the wire 21 appears as shown in the curve 67 of FIG. 5, with the temperature of the junction 20 rising from a time $t_1'$ until it reaches a maximum preheat temperature $T_p$ at a time $t_2'$ and then decreasing until the wire passes through the extruder head 43 at a time $t_3'$, when the temperature thereof rises until it reaches a maximum temperature $T_m'$ at a time $t_4'$ when the wire enters the cooling trough 48. Thereafter the temperature of the wire decreases to some final temperature $T_f'$.

Figure 6:
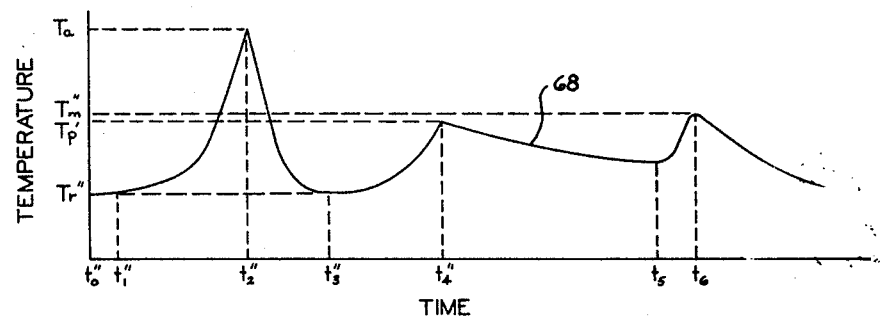
FIG. 6 is a curve similar to FIGS. 4 and 5 representing the time variation of the temperature of a conductor wire undergoing an insulation process wherein the wire is annealed, quenched, preheated, insulated and cooled.

Referring to FIG. 6, the curve 68 represents the time variation in temperature of a junction 20 as it passes through the line 26 with both the annealer 41 and the preheater 42 in operation. For this temperature response characteristic, the copper slip ring 58 may be positioned to contact the wire 21 at a point 62'' between the reel 28 and the annealer 41. Alternatively, the trailing end of the wire 21 on the reel 28 may be connected directly to the recorder 57. The latter direct connection of the wire 21 to the recorder 57 may be complicated, however, by the generation of spurious emfs which may occur each time the wire 21 flying off the reel 28 strikes the inside surface of the hood 33, if the latter is constructed of metal. Furthermore, if the annealer 41 utilizes resistance heating, it must be properly grounded to avoid the generation of spurious emfs therein.

As a junction 20 is passed through the annealer 41, it is heated, rising from a time $t_1''$ to a sharp point at a relative high temperature $T_a$, at a time $t_2''$. $T_a$ may have a value of from 800°F to 1000°F for copper. The junction 20 is then rapidly quenched in a water bath (not shown) which may be contained within the annealer 41 until its temperature declines to approximately ambient temperature $T_r''$ at a time $t_3''$. Thereafter the wire may be preheated to a temperatute $T_p'$ at a time $t_4''$, cooled in air as it leaves the preheater, insulated at a time $t_5$, reaching a temperature $T_m''$ at a time $t_6$, and cooled again as described above in connection with the discussion of FIG. 5.

As mentioned previously, if a patchwork wire 23, containing several spaced junctions 20—20, is utilized, the segments 22—22 of constantan joined to the segments of copper 21—21 should be of sufficient length, depending upon the length of the path through the insulating line 26, to permit only one junction 20 to pass through the insulating line 26 at any given time. Since the junctions 20—20 stored on the reel 28 are all at ambient temperature, they may act collectively as a reference junction for the junction 20 passing through the line if the copper slip ring 58 is not utilized.

The above method may be utilized to measure the melt temperature of plastic insulation at the instant of contacting a conductor wire by forming a series of junctions 20—20 as shown in FIG. 2 and passing the wire containing the junctions serially through the preheater 42 and the extruder 46, as shown in the curve 67 of FIG. 5, and raising the temperature of the preheater 42 gradually and incrementally until the temperature at time $t_3'$ becomes equal to the temperature at time $t_4'$. After time $t_4'$ the temperature of the wire would be a constantly decreasing function with the temperature recorded just before the decrease being the melt temperature of the plastic insulation 47.

While the invention has thus far been described in connection with a plastic insulating line for copper wire, it will be realized that the method described has much broader applications. For example, a thermoelectric junction such as shown in FIG. 1, or several thermoelectric junctions as shown in FIG. 2, may be incorporated in any suitable elongated conductor utilizing a suitable dissimilar metal joined thereto. Additionally, the conductor may be insulated with pulp material rather than plastic or may undergo several processes other than insulation.

For example, the invention has application in wire drawing, particularly after the rod stock has been broken down, by forming a thermocouple junction in the rod to record the temperature of the junction as it enters the drawing die. Difficulties may be encountered, however, beyond the drawing die since the thermoelectric junction will undergo some deformtion as it is drawn down and will no longer be a well-defined boundary as shown in FIG. 1.

The invention may also be utilized to predict the temperature behavior of aluminum rod stock in the hydrostatic extrusion thereof into conductor wire by forming a thermoelectric junction in the rod with a length of suitable alloy.

Additionally, in jacketing cable, the temperature of the interior of the cable may be studied by forming one or more thermoelectric junctions in one or more of the conductors in the cable, together with suitable connections to a potentiometric recording device.

In plating or in tinning wires, the above-described method may be utilized to measure the temperature response of the wire as the plating or tinning is carried out. Still furthermore, the temperature of a wire or cable packaged on a reel may be monitored or measured by making appropriate connections to a thermoelectric junction formed in the wire or cable.

Additionally, thermoelectric junctions formed by butt-joining long lengths of wire as disclosed above may be utilized as other thermocouples are utilized, i.e., fixing the junctions at inexcessable locations to provide a temperature monitoring facility at those locations, for example, in a buried cable or wire.

The above-described applications of the present invention are not considered to be an exhaustive list and many other applications may be devised by those skilled in the art which, though not specifically enumerated, are intended to be and come within the spirit and scope of the inveniton as set forth in the following claims.

What is claimed is:

1. A method of measuring the temperature of a movable elongated conductor which comprises the steps of:
   joining an end of a length of dissimilar conductor to an end of the elongated conductor to form a thermocouple junction between the joined conductors;
   serially connecting the formed junction in a circuit through either conductor to a second thermocouple junction at a known temperature to generate a potential across the junctions which is directly related to the temperature difference therebetween;
   moving the joined conductors longitudinally to move the formed junction along the longitudinal path of the conductors; and
   measuring the generated potential while the junction is moving to obtain the temperature of the elongated conductor at the formed junction.

2. The method of claim 1 wherein the elongated conductor and the dissimilar conductor are formed of copper and constantan, respectively, and said step of joining said conductors includes butt-joining the ends thereof together axially to form a well-defined boundary therebetween.

3. A method of measuring the temperature of a movable elongated conductor which comprises the steps of:
   joining in a circuit the ends of a length of dissimilar conductor to the elongated conductor at an intermediate section thereof to form a pair of spaced serially connected thermocouple junctions, one of said junctions having a known temperature, and the other of said junctions having an unknown temperature, to generate a potential across the formed junctions which is directly related to the temperature difference therebetween;
   moving the joined conductors longitudinally to move the unknown junction along the longitudinal path of the conductors; and
   measuring the generated potential while the junction is moving to obtain the temperature of the elongated conductor at the unknown junction.

4. The method of claim 3 wherein the elongated conductor and the dissimilar conductor are formed of copper and constantan, respectively, and said step of joining the ends of the length of dissimilar conductor to an intermediate section of the elongated conductor includes butt-joining the ends thereof axially to the ends of said intermediate section of said elongated conductor to form two well-defined boundaries therebetween.

5. A method of measuring the temperature of an elongated conductor, which comprises the steps of:
   joining in a circuit the ends of a plurality of lengths of a second dissimilar conductor alternately to a plurality of lengths of the elongated conductor, to form a plurality of spaced serially connected thermocouple junctions, the temperatures of all but one of the formed junctions being known, to generate a potential across the formed junctions which is directly related to the temperature difference between the junctions;
   moving the joined conductors longitudinally to move the unknown junction along the longitudinal path of the conductors; and
   measuring the generated potential while the junction is moving to obtain the temperature of the elongated conductor at the unknown junction.

6. The method of claim 5 wherein the lengths of the elongated conductor and the dissimilar conductor are formed of copper and constantan, respectively, and said step of joining said ends of said conductors alternately includes butt-joining the ends of alternating lengths thereof axially to form a plurality of well-defined boundaries therebetween.

7. A method of determining the temperature variation of an elongated conductor as it undergoes a process, wherein thermal energy is transferred between the conductor and the process, which comprises the steps of:
joining an end of at least one length of dissimilar conductor to an end of the elongated conductor to form at least one thermocouple junction;
serially connecting the formed junction in a circuit through either conductor to a second similar junction at a known temperature to generate a potential across the junctions which is directly related to the temperature dirrerence therebetween;
moving the joined conductors longitudinally through the process to move at least one formed junction through the process to obtain a history of the moved junction in terms of a generated potential; and
measuring the generated potential to obtain the temperature history of the elongated conductor at the formed junction moved through the process.

8. The method of claim 7 wherein the elongated conductor and the dissimilar conductor are formed of copper and constantan, respectively, and the step of joining the conductors includes butt-joining the ends of the conductors together axially to form a well-defined boundary therebetween.

9. The method of claim 8 wherein the process is an insulating process.

10. The method of claim 9 wherein the insulating process includes the step of extruding a plastic sheath around the peripheral surface of the first junction.

11. The method of claim 9 wherein the insulating process includes the step of covering the peripheral surface of the first junction with pulp material.

12. An apparatus for measuring the temperature of a movable elongated conductor which comprises:
a length of dissimilar conductor;
a thermocouple junction formed by joining an end of said length of dissimilar conductor to an end of the elongated conductor;
a second thermocouple junction having a known temperature;
means for serially connecting said formed junction in a circuit through either conductor to said known junction to generate a potential across the junction which is directly related to the temperature difference therebetween;
means for moving the joined conductors longitudinally to move the formed junction along the longitudinal path of the conductors; and
means for measuring the generated potential while the junction is moving to obtain the temperature of the elongated conductor at the formed junction.

13. An apparatus as set forth in claim 12 wherein the elongated conductor and said length of dissimilar conductor are formed of copper and constantan, respectively, and said formed thermocouple junction is formed by butt-joining the ends of the conductors axially to form a well-defined boundary therebetween.

14. An apparatus as set forth in claim 12, wherein said connecting means is a bare wire contact device formed of the same material as said elongated conductor and positioned along the longitudinal path of said conductors in engagement therewith at a point and said second thermocouple junction is the point of engagement of said contact device when it engages said dissimilar conductor.

15. An apparatus as set forth in claim 12 wherein said connecting means is a bare wire contact device formed of the same material as said dissimilar conductor and positioned along the longitudinal path of said joined conductors in engagement therewith at a point, and said second thermocouple junction is the point of engagement of said contact device when it engages said elongated conductor.

16. An apparatus as set forth in claim 13 wherein said bare wire contact device is a rotatable slip ring formed of copper and positioned in rolling contact with said joined conductors.

17. An apparatus as set forth in claim 13 wherein said bare wire contact device is a slip ring formed of constantan and positioned in rolling contact with said joined conductors.

18. An apparatus as set forth in claim 12 wherein said second thermocouple junction includes a length of the elongated conductor butt-joined axially to the other end of the length of said dissimilar conductor.

19. An apparatus for determining the temperature variation of an elongated conductor as it undergoes a process wherein thermal energy is transferred between the conductor and the process, which comprises:
at least one thermocouple junction formed in the conductor by joining an end of at least one length of a dissimilar conductor to the elongated conductor;
a second thermocouple junction having a known temperature;
means serially connecting at least one formed junction in a circuit through either conductor to said junction at a known temperature to generate a potential across the junctions which is directly related to the temperature difference therebetween;
means for moving the joined conductors longitudinally through the process to move at least one formed junction through the process to obtain a history of the moved junction in terms of a generated potential; and
means for measuring the generated potential to obtain the temperature history of the elongated conductor at the formed junction moved through the process.

20. An apparatus as set forth in claim 19 wherein the elongated conductor and said length of dissimilar conductor are formed of copper and constantan, respectively, and said formed thermocouple junction is formed by butt-joining the ends of the conductors axially to form a well-defined boundary therebetween.

21. An apparatus as set forth in claim 20 wherein said connecting means is a bare wire contact device formed of the same material as said elongated conductor and positioned along the longitudinal path of said joined conductors in engagement therewith at a point and said second thermocouple junction is the point of engagement of said contact device when it engages said dissimilar conductor.

22. An apparatus as set forth in claim 21 wherein said bare wire contact device is a slip ring formed of constantan in rolling contact with said joined conductors.

23. An apparatus as set forth in claim 20 wherein said connecting means is a bare wire contact device formed of the same material as said dissimilar conductor and positioned along the longitudinal path of said joined conductors in engagement therewith at a point, and said second thermocouple junction is the point of engagement of said contact device when it engages said elongated conductor.

24. An apparatus as set forth in claim 20 wherein said bare wire contact device is a slip ring formed of copper in rolling contact with said joined conductors.

25. An apparatus as set forth in claim 19 wherein said second thermocouple junction includes a length of said elongated conductor butt-joined axially to the other end of said length of dissimilar conductor.

* * * * *